Figure 1:
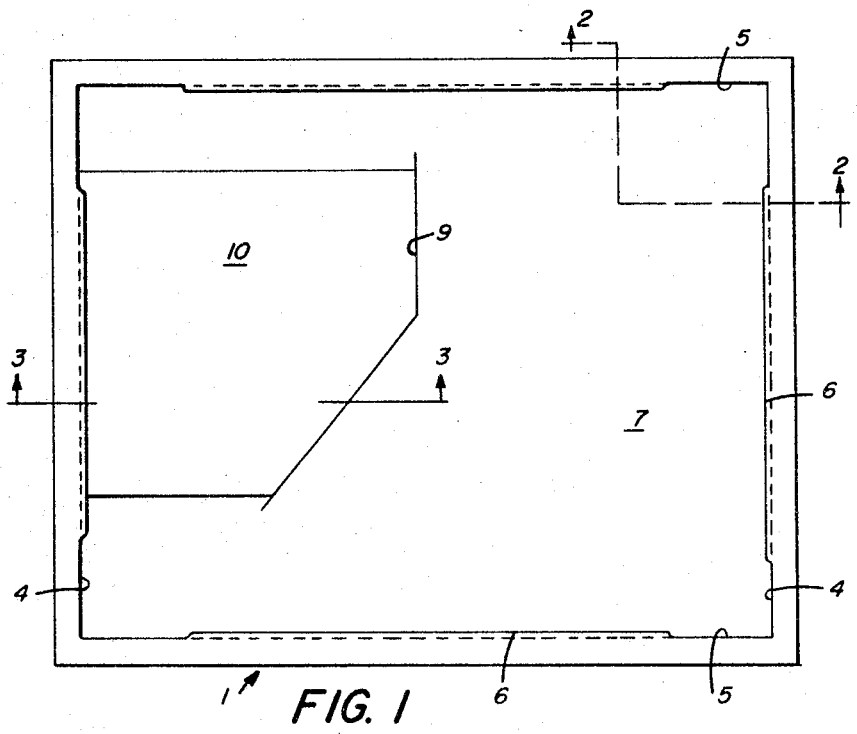
Figure 2:
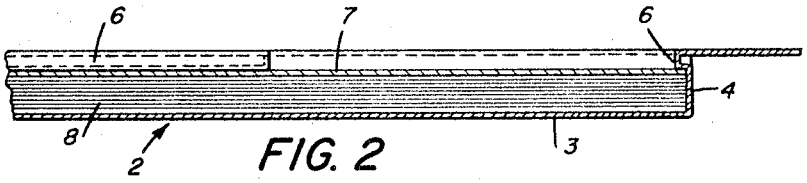
Figure 3:
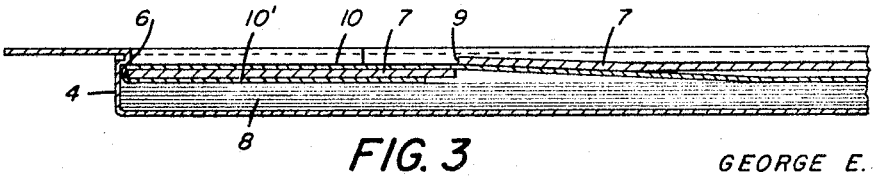

T862023

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1011

801,536

ENLARGEMENT PRINT FRAME AND MAILER

George E. Daddis, Penfield, and Edward A. Ehlers and Leonard S. Mattioli, Rochester, N.Y. (all of 1669 Lake Ave., Rochester, N.Y. 14650)

Filed Feb. 24, 1969. Published May 27, 1969
Int. Cl. B65d *11/20, 5/52, 85/30*
U.S. Cl. 206—45.2
1 Sheet Drawing. 5 Pages Specification

A package (1) for 8″ x 10″ photographic enlargement prints, or the like, which is used for handling, mailing, or as a frame. The package includes a tray (2) having a rectangular base panel (3) and side and end walls (4) (5) extending from the edges of the base panel at generally right angles thereto. The tray (2) receives a stack of prints (8) and a cardboard cover panel (7). Locking flanges (6) on the upper marginal edges of the side and end walls of the tray overlie the marginal edges of the

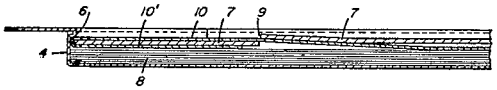

cover panel to hold the panel (7) and prints (8) within the tray (2). The entire tray is made of a clear plastic material, e.g. oriented polystyrene, which is thermoformed to the desired tray configuration. For handling and mailing, an envelope (10) may be attached to the package. This is accomplished by insertion of one end of the envelope into a slot (9) in the cover panel (7) and wrapping of the envelope flap (10′) at the other end around the marginal portion of the cover panel (7) which underlies a locking flange (6). If desired, the package can be converted to a frame for one of the enlargement prints. To do so, the print is placed in the tray (2) so that it is visible through the base panel (3) of the tray (2). The cardboard cover panel (7) is used as a backing to hold the print in place. A portion of the cover panel may be bent outwardly to provide a support leg whereby the frame can be placed in an upright position.

T862023

SN - 801536

May 27, 1969 G. E. DADDIS ET AL DEF. PUB.

ENLARGEMENT PRINT FRAME AND MAILER

Filed Feb. 24, 1969

GEORGE E. DADDIS
EDWARD A. EHLERS
LEONARD S. MATTIOLI
INVENTORS

BY Paul R. Holmes
William E. Jackson
ATTORNEY & AGENT